United States Patent

Yamazaki et al.

[11] Patent Number: 6,015,361
[45] Date of Patent: Jan. 18, 2000

[54] DIFFERENTIAL APPARATUS WITH TWO WHEEL/FOUR WHEEL DRIVE SWITCHING MECHANISM

[75] Inventors: Nobushi Yamazaki; Masao Teraoka; Takeharu Saeki, all of Tochigi, Japan

[73] Assignee: Tochigi Fuji Sangyo Kabushiki Kaisha, Tochigi-ken, Japan

[21] Appl. No.: 08/920,856

[22] Filed: Aug. 29, 1997

[30] Foreign Application Priority Data

Aug. 30, 1996 [JP] Japan .................................. P8-230576

[51] Int. Cl.⁷ .......................... B60K 23/08; F16H 48/06
[52] U.S. Cl. ..................... 475/230; 180/247; 192/85 V; 192/91 R; 192/69.82; 475/248
[58] Field of Search ................... 192/85 V, 89.2, 192/91 R, 91 A, 89.26, 93 R, 93 A, 69.82; 475/230, 231, 220; 180/247, 248

[56] References Cited

U.S. PATENT DOCUMENTS

| | | | |
|---|---|---|---|
| 5,098,360 | 3/1992 | Hirota | 475/231 X |
| 5,149,309 | 9/1992 | Guimbretiere | 475/234 |
| 5,176,591 | 1/1993 | Krisher | 475/248 X |
| 5,740,895 | 4/1998 | Bigley | 192/85 V |
| 5,890,989 | 4/1999 | Yamazaki et al. | 475/230 X |

Primary Examiner—Charles A Marmor
Assistant Examiner—Ankur Parekh
Attorney, Agent, or Firm—Howard & Howard

[57] ABSTRACT

A differential apparatus includes a differential casing, a pair of output side gears disposed in the differential casing, a differential mechanism distributing driving force of an engine, a clutch for operatively connecting the differential casing with the axles of the vehicle, an actuator for releasing the clutch from its connecting operation, and an urging member for causing the clutch to connect the differential casing with the axles of the vehicle. When the actuator is inactivated, the urging member serves to attain the connecting operation of the clutch. Therefore, even if the actuator is in a bad condition, four-wheel driving condition of the vehicle can be maintained. Therefore, the differential apparatus allows the vehicle to escape from a bad road.

8 Claims, 6 Drawing Sheets

4WD

2WD

4WD

DIFFERENTIAL APPARATUS WITH TWO WHEEL/FOUR WHEEL DRIVE SWITCHING MECHANISM

BACKGROUND OF THE INVENTION

The present invention relates to a differential apparatus installed in a four-wheel drive vehicle. More particularly, it relates to a differential apparatus arranged on the side of axles to be operatively separated from the driving force of an engine under a two-wheel driving condition of the vehicle.

The prior art includes a differential apparatus as shown in FIG. 1, which is similar to that disclosed in Japanese Patent Publication (kokai) No. 63-235748.

The differential apparatus 301 is provided, inside a differential casing 303, with a ring 305 which is rotatably arranged therein. A pinion shaft 309 of a bevel-gear type of differential mechanism 307 is connected to ring 305. Further, at the interior of the differential casing 303, a slide gear 311 is arranged to move in the axial direction of the differential casing 303. A dog clutch 313 is formed between the slide gear 311 and the ring 305 of the differential mechanism 307 and connects the differential casing 303 with the ring 305 or disconnects the former from the latter owing to the operation to move the slide gear 311.

A hydraulic actuator 315 disposed outside the differential casing 303 operates to move the slide gear 311 through the intermediary of a shift fork 317 thereby to engage the dog clutch 313. Conversely, when the hydraulic actuator 315 is inactivated, the slide gear 311 returns to the opposite direction by a return spring 319, so that the dog clutch 313 is disengaged.

Under condition that the differential apparatus 301 is installed in the four-wheel drive car, when the dog clutch 313 engages, the vehicle is brought into the four-wheel driving condition. On the other hand, when dog clutch 313 is disengaged, the vehicle is brought into the two-wheel driving condition.

Generally speaking, in a differential apparatus having a clutch for connecting and disconnecting the driving force, if the actuator has any trouble in operation, it is likely that the vehicle cannot travel under four-wheel driving condition. In such a case, it will be impossible for the vehicle to escape from a bad road.

Also, the greater part of traveling period for a four-wheel driving vehicle is occupied in its two-wheel driving state, it has been required to reduce energy consumption during two-wheel driving, if possible.

SUMMARY OF THE INVENTION

It is therefore an object of the present invention to provide a differential apparatus for a four-wheel drive vehicle, which includes a clutch operated by an actuator, for connecting and disconnecting driving force of an engine and which is capable of connecting the clutch even when the actuator is in a bad condition to enable the vehicle to travel under the four-wheel driving condition.

Essentially, the clutch and actuator and an urging mechanism constitute a two-wheel to four-wheel drive switching mechanism. The two-wheel to four-wheel drive switching mechanism is preferably arranged to be near a differential casing.

The object of the present invention described above can be accomplished by a differential apparatus for a vehicle having an engine comprising: a differential casing having an input gear fixed thereto, the differential casing being rotated by the engine through an intermediary of the input gear; a pair of output side gears disposed in the differential casing so as to oppose each other and rotate coaxially with an axis of the differential casing; a differential mechanism distributing driving force of the engine, which has been inputted from the differential casing, into both axles of said vehicle through the output side gears; a clutch for operatively connecting the differential casing with the axles of the vehicle so that driving torque applied on the differential casing is transmitted to the axles; an actuator for releasing the clutch from connecting operation thereof in a manner that the driving torque applied on the differential casing is not transmitted to the axles; and an urging member for causing the clutch to connect the differential casing with the axles on condition that the actuator is inactivated, whereby the driving torque applied on the differential casing can be transmitted to the axles.

In this way, according to the invention, the differential apparatus is constructed in a manner that the actuator serves to release connecting operation executed by the clutch and that, when the actuator is inactivated, the urging member serves to attain the connecting operation by the clutch. Therefore, providing that the so-constructed differential apparatus is used for the four-wheel drive vehicle and even if the actuator is unfortunately in a bad condition the four-wheel driving condition of the vehicle can be maintained since the urging member allows the clutch to be connected, whereby the vehicle can escape from a bad road, for example.

In the above-mentioned differential apparatus, preferably, the urging member comprises an annular urging member disposed coaxially with a rotational axis of the differential casing.

In this case, the arrangement allows operational force for connecting the clutch to equalize in the circumferential direction of the differential casing, whereby the associating operation of the clutch can be carried out smoothly and responsively.

In the above-mentioned differential apparatus, more preferably, the actuator comprises an annular actuator disposed coaxially with the rotational axis of the differential casing.

Then, with the arrangement, it is possible to equalize the operational force required for disconnecting (or releasing) the clutch in the circumferential direction of the differential casing, whereby the releasing operation of the clutch can be carried out smoothly and responsively. In addition, it is possible to make the differential casing more compact in the axial direction and increase the volume of the actuator, correspondingly.

More preferably, the actuator comprises a fluid pressure actuator disposed between a sidewall of the differential casing and a bearing for carrying the differential casing. The fluid pressure actuator has an operating chamber filled with fluid, whereby the associating operation of the clutch can be released since the clutch is shifted in a direction of the rotational axis of the differential casing by changing a volume of the fluid accommodated in the operating chamber.

In the above case, it is possible to decrease the level of fluid pressure required for activating the actuator. In other words, it is possible to reduce a burden on a pressure source for the actuator. Further, by making good use of otherwise dead space, it is possible to make the whole differential apparatus compact.

In the above-mentioned arrangement, more preferably, the urging member is disposed in the fluid pressure actuator.

In this case, it is possible to facilitate assembling, detaching and exchanging operations of the fluid pressure actuator, whereby the maintenance cost can be reduced remarkably.

Alternatively, it is also preferable that the urging member is arranged so that one end thereof comes into contact with the differential casing while another end of the urging member comes into contact with the clutch.

In this case, the above arrangement allows the clutch member to be manipulated directly while establishing the differential casing secured in the axial direction as a fulcrum. If the clutch member is operatively associated with the differential casing besides the clutch member's axial movement with respect to the differential casing, both ends of the urging member can be prevented from being worn to improve the durability of the differential apparatus.

In the present invention, preferably, the differential casing comprises an outer case which rotates by the driving force of the engine, an inner case which is arranged in the outer case to rotate relative to the outer case, and a clutch member movably connected to either one of the outer case and the inner case through a connecting part of the clutch member. Preferably, the clutch is interposed between the clutch member and the other one of the outer case and the inner case, so that the actuator is capable of moving the clutch member in a direction where the association of the differential casing with the axles of the vehicle due to the clutch will be released.

With the above-mentioned arrangement, when the clutch is operated for connection, the outer case is connected with the inner case, so that the driving force of the engine is transmitted from the outer case to the inner case, thereby operating the differential mechanism. Further, when the association of the clutch is released by the actuator, the vehicle is brought into its two-wheel driving condition, while the outer case is operatively separated from the inner case, so that elements from the inner case to the wheel through the differential gear mechanism can rotate freely. Correspondingly, a power transmission system from a two/four wheel drive switching mechanism disposed between the engine and the differential apparatus up to the outer case is prevented from rotating together with the inner case. Consequently, with reduced vibrations of the vehicle, it is possible to make travel more comfortable. In addition, frictional wear of the power transmission system can be decreased to improve the durability. Furthermore, it is possible to reduce a burden on the engine corresponding to the reduction in rotational resistance, whereby the vehicle can be economical on fuel. Additionally, since the association of the clutch is released between the outer case and the inner case, the operation is not influenced by a difference between the right axle and the left axle of the vehicle. Again, since each of the axles is not divided into pieces, there is no need to modify the conventional design of the axles.

In the above-mentioned arrangement, more preferably, the actuator is arranged outside the outer case and adapted to operatively move the clutch member which is inserted into the outer case through an opening formed in the outer case and which is connected to the actuator.

Of course, also in this case, it is possible to obtain effects similar to those in the above-mentioned arrangement of the differential casing. Note that, the outer case is generally provided with lubrication openings. Accordingly, if one of the openings is utilized in order to define a connecting part with the clutch member, the resulting differential apparatus can be produced economically.

In the present invention, preferably, the outer case and the clutch member are provided, at both connecting parts thereof, with cams which are subjected to the driving torque transmitted thereby to exert a thrust force on the clutch, whereby the differential casing can be associated with the axles of the vehicle.

In this case, owing to the cam's assistance, the connecting operation of the clutch can be carried out certainly and prevented from being disengaged due to vibrations caused during the vehicle's traveling, whereby a stable four-wheel driving condition can be realized in the vehicle's traveling. Further, the more the cam assists the clutch to be connected, the smaller an urging force of the urging member can be established. Thus, in such a case, it is possible to miniaturize the actuator and its power source to that extent, whereby the vehicle can be economical on fuel. In addition, it is possible to reduce a burden and abrasion on frictional portions which are subjected to an urging force of the urging member and an operative force of the actuator, thereby improving the durability.

In the differential apparatus comprising the differential casing, the differential mechanism, the clutch, the actuator and the urging member, preferably, the differential apparatus further comprises output members each of which is disposed between each of the output side gears and each of the axles. A clutch member is movably connected to either one of the output members and either one of the side gears through a connecting part of the clutch member. Preferably, the clutch is interposed between the other one of the output members and the other one of the side gears, whereby the actuator is capable of moving the clutch member in a direction where the association of the differential casing with the axles of the vehicle due to the clutch will be released.

In operation of the above-mentioned differential apparatus, when the clutch is operated for connection, the side gears are respectively connected with the output members, so that the driving force of the engine is transmitted from the side gears to the axles through the intermediary of the output members, thereby operating the differential mechanism. On the other hand, when the association of the clutch is released, the side gears are separated from the output members and the driving force is cut off at the differential mechanism by the racing of the side gears, so that the vehicle is brought into its two-wheel driving condition. Further, with the separation of the side gears from the output members, elements from the output members to the wheels can rotate freely. Correspondingly, a power transmission system from the two/four wheel drive switching mechanism up to the differential mechanism is prevented from rotating together with the output members. Consequently, with reduced vibrations of the vehicle, it is possible to improve ride comfort. In addition, frictional wear of the power transmission system can be decreased to improve the durability. Furthermore, it is possible to reduce a burden on the engine corresponding to the reduction in rotational resistance, whereby the vehicle can be economical on fuel. Note, as each of the axles is divided into pieces in the above-mentioned differential apparatus, there is no need to modify the conventional design of the axles.

In the present invention, preferably, the fluid pressure actuator is a negative pressure actuator.

In this case, as differential from a positive pressure actuator, it is possible to prevent the durability of the differential apparatus from deteriorating due to the expansion of tubes or pipes for introducing the pressure. Further, by making use of the available negative pressure in an intake manifold of the engine, there is no need to provide an exclusive pump for driving the clutch.

These and other objects and features of the present invention will become more fully apparent from the following description and appended claims taken in conjunction with the accompanying drawings.

DESCRIPTION OF THE PREFERRED EMBODIMENT

Embodiments in accordance with the present invention will be described with reference to the drawings.

Figure 1:
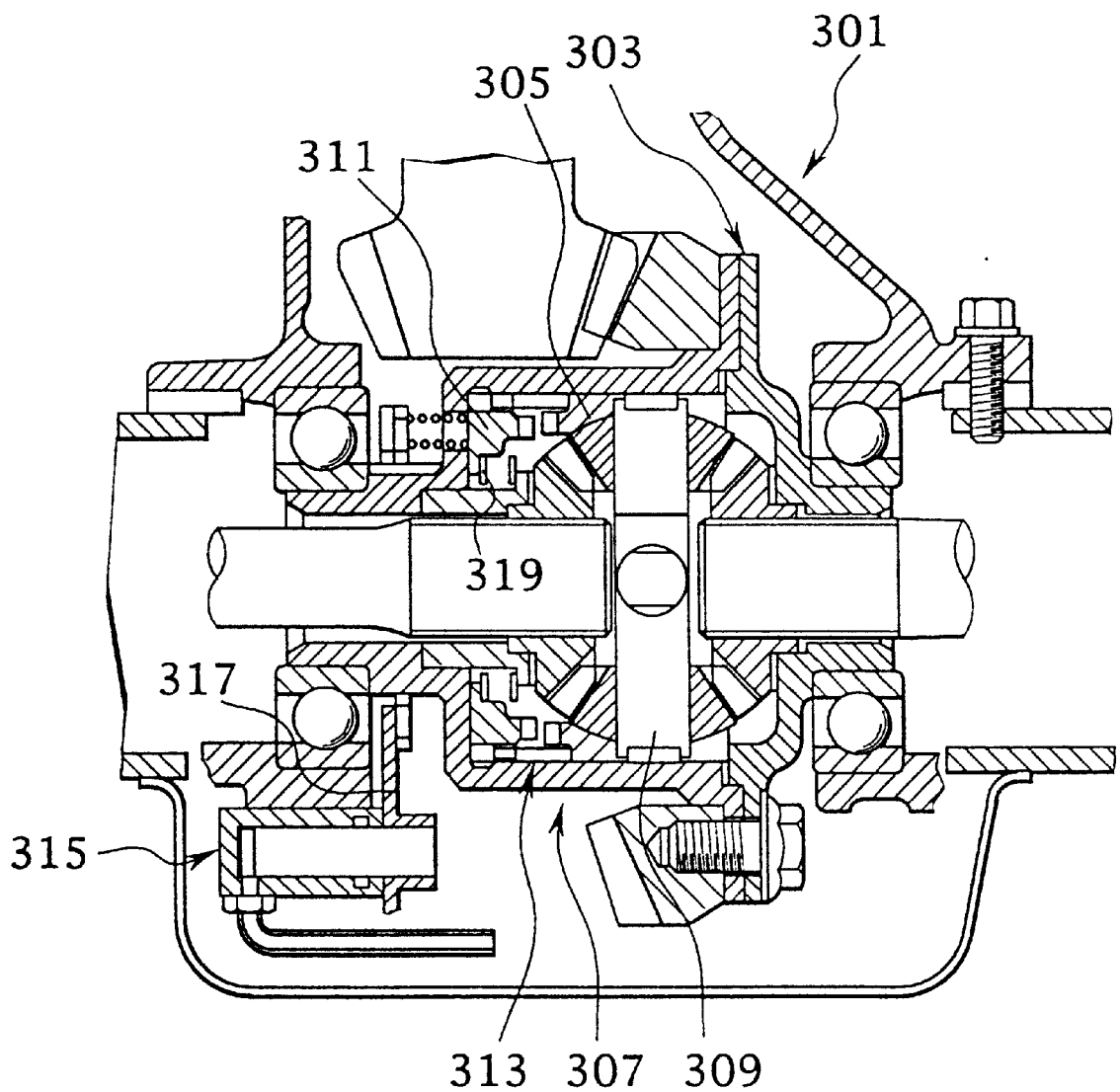
FIG. 1 is a cross sectional view of a conventional differential apparatus.
Figure 2:
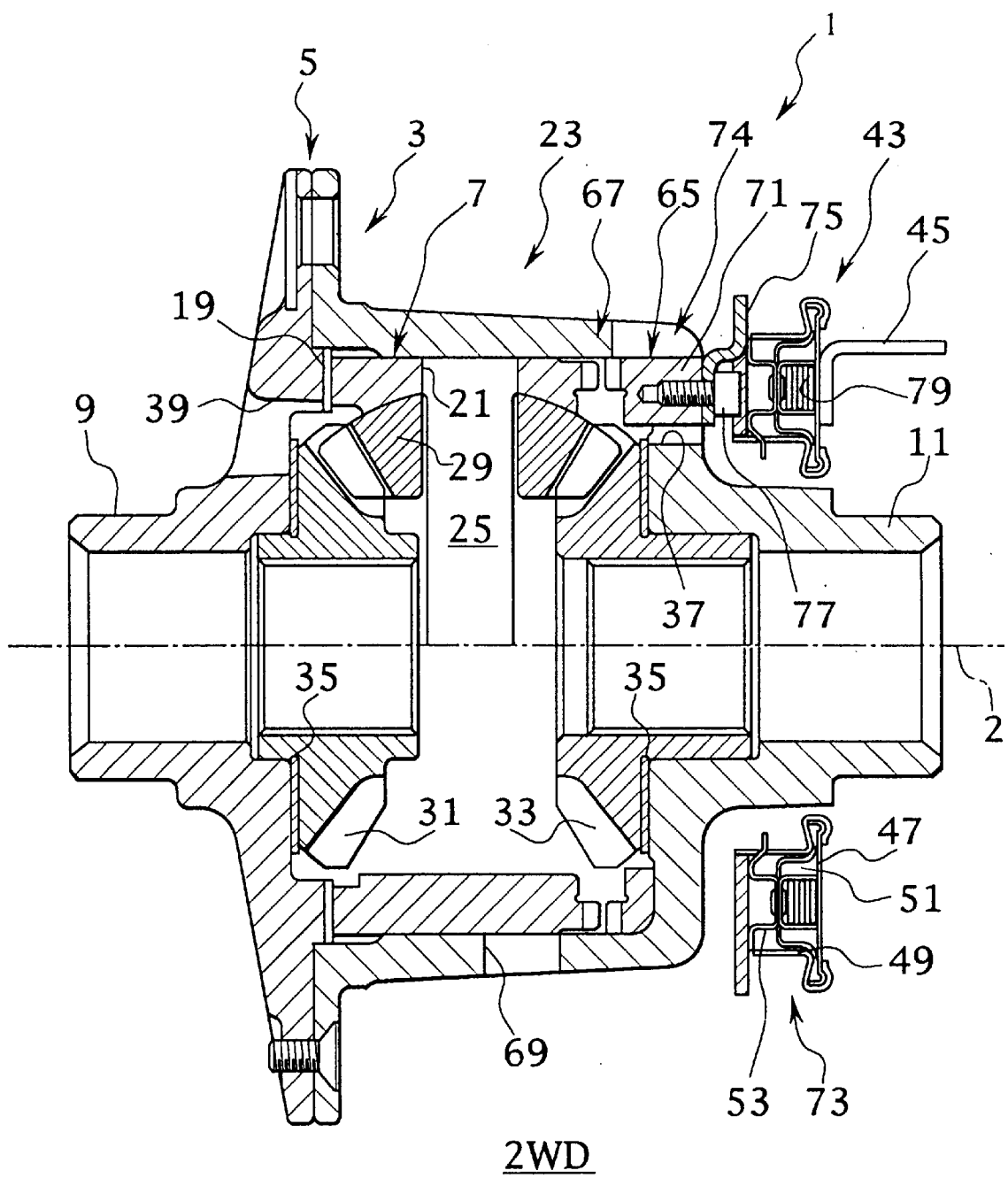
FIG. 2 is a cross sectional view of a differential apparatus in accordance with a first embodiment of the present invention.
Figure 3:
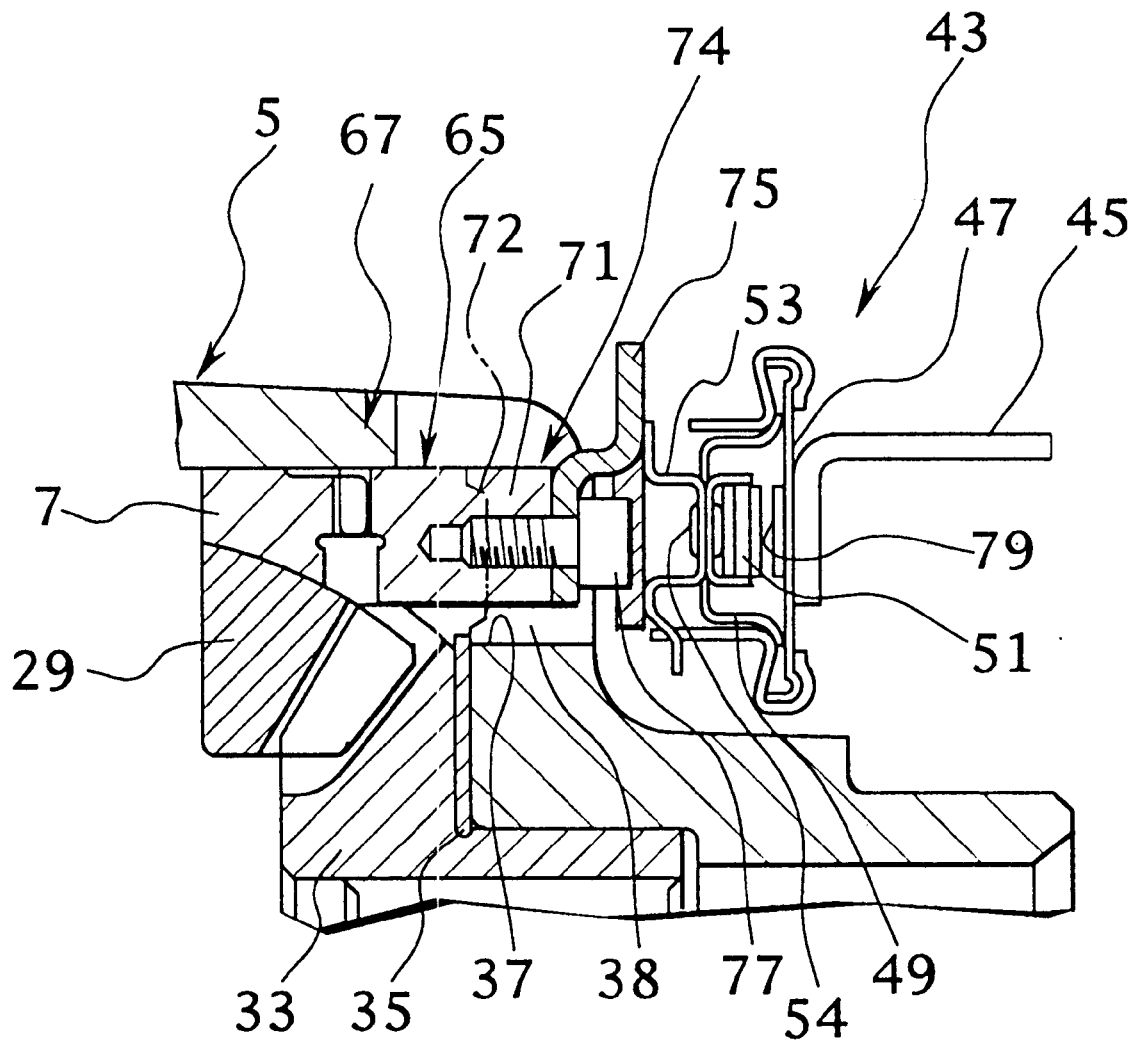
FIG. 3 is a cross sectional view of an essential part of the differential apparatus of the first embodiment.

The first embodiment of the invention is shown in FIGS. 2 and 3. It is noted that, throughout this description, right and left directions correspond to right and left directions shown in the figures, respectively. Further, of course, elements with no reference numerals in the description are not shown in the figures.

In FIG. 2, reference numeral 1 designates a differential apparatus in accordance with the first embodiment of the invention, which is installed in a four-wheel drive vehicle and further arranged on the side of axles to which driving force of an engine is not transmitted under the vehicle's two-wheel driving condition. In addition, reference numeral 2 denotes a rotational axis of the differential apparatus 1, and 3 a differential casing.

The differential casing 3 of the differential apparatus 1 consists of an outer case 5 and an inner case 7. Inner case 7 is carried at the interior of the outer case 5 so as to rotate in case 5. The differential casing 3 is arranged inside a not-shown differential carrier. A left boss portion 9 and a right boss portion 11 of the outer casing 5 are born by the differential carrier through the intermediary of not-shown bearings. In addition, an oil reservoir is formed at an interior of the differential carrier, although the oil reservoir is not shown in the figure.

A not-shown ring gear is secured on the outer case 5 by means of bolts. The ring gear meshes with an output gear in a power transmission system. In this way, the outer case 5 is driven on rotation by the driving force of the engine. Note, reference numeral 19 designates a thrust washer which is subjected to a thrust force from a dog clutch which will be mentioned later.

In this power transmission system, a two/four wheel drive switching mechanism is arranged for cutting off the driving force of the engine at the two-wheel driving of the vehicle.

The inner case 7 is provided with through holes 21 (only one shown in the figure) into which both ends of a pinion shaft 25 of a bevel-gear type of differential mechanism 23 are engaged. Rotatably mounted on the pinion shaft 25 are respective pinion gears 29 which mesh with a pair of left and right output side gears 31, 33.

The side gears 31, 33 are spline-coupled to axles extending from wheels of the vehicle, respectively. A pair of thrust washers 35, 35 are interposed between the respective side gears 31, 33 and the outer case 5 for receiving thrust force brought by the meshing side gears 31, 33.

The outer case 5 is provided, at even intervals in the circumferential direction, with openings 37, 39 through which lubrication oil in the oil reservoir of the differential carrier flows in and out of the outer case 5. Further, each of the boss portions 9, 11 has a spiral oil groove formed on the inner periphery for introducing the lubricating oil into the outer case 5 by its rotation.

As clearly shown in FIGS. 2 and 3, the differential apparatus 1 is provided, inside the outer case 5, with an annular clutch member 65 which is supported so as to move in the axial direction of the outer case 5. According to the embodiment, a dog clutch 67 is constituted by a part of the inner case 7 and the clutch member 67. In addition to the above-mentioned openings 37, 39, an opening 69 is also formed in the outer case 5. A leg portion 71 of the clutch member 65 is engaged into each of the openings 37.

According to the embodiment, opposing faces 38 defining each opening 37 are so tapered as to be gradually apart from each other as they approaches toward the interior of the outer case 5 along the rotational axis 2 (to the left in the figure. Corresponding to the faces 38, opposing faces 72 of each leg portion 71 of the clutch member 65 are also formed so as to be gradually apart from each other as they approaches to the left in the figure. In this way, a taper-shaped cam 74 is contracted.

Figure 4:
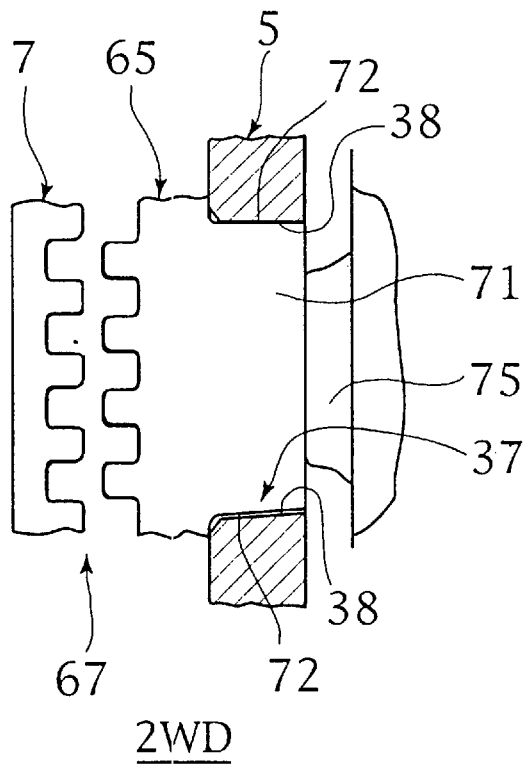
FIG. 4 is a schematic view of a dog clutch of the differential apparatus of the first embodiment, showing a disengaged condition of the dog clutch.

FIG. 4 shows a condition that the clutch member 65 is drawn to the right, whereby the meshing state at the dog clutch 67 is released. While, FIG. 5 shows a condition that the clutch member 65 is urged to move to the left, whereby the dog clutch 67 is activated.

Figure 5:
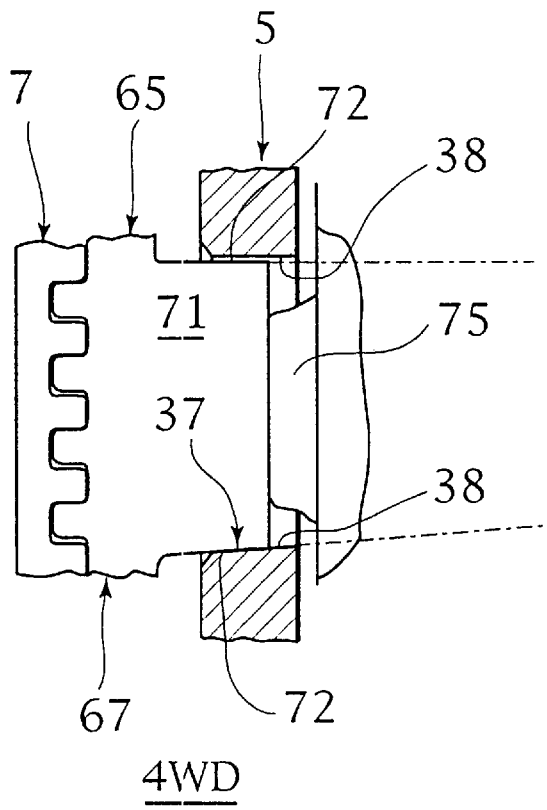
FIG. 5 is a schematic view of the dog clutch of the differential apparatus of the first embodiment, showing the engaged condition.

In operation, when the dog clutch 67 is engaged as shown in FIG. 5, the cam 74 exerts a thrust force directing to the left on the clutch member 65 owing to the tapered configuration. Consequently, the engagement condition at the dog clutch 67 can be further enhanced by the application of the thrust force.

Arranged about the right boss portion 11 of the outer case 5 is an annular-shaped pneumatic actuator 43 which is carried by the differential carrier through a supporting member 45. This actuator 43 includes a pressure chamber 51 which is composed of a baseplate 47 and a diaphragm 49 fixed on the baseplate 47 in a leak-tight manner. A pusher member 53 is secured on the diaphragm 49 by means of a rivet 54. The actuator 43 is also disposed coaxially with the rotational axis 2 of the differential casing 3. With this arrangement, it is possible to equalize operational force required for engaging the dog clutch 67 in the circumferential direction of the differential casing 3, whereby the engagement operation at the dog clutch 67 can be carried out smoothly and responsively. In addition, it is possible to make a size of the differential casing 3 compact in the axial direction and increase a volume of the actuator 43, correspondingly. Further, since the actuator 43 is disposed while making good use of dead space, it is possible to make the whole differential apparatus 1 compact.

On the left side of the pusher member 53, a pusher plate 75 is disposed and fixed on the leg portions 71 of the clutch member 65 via. bolts 77.

The pneumatic actuator 73 is constituted by a "so-called" negative pressure actuator. For this, the pressure chamber 51 is communicated with an intake manifold of the engine through an air passage, so that negative pressure is supplied into the chamber 51. Note, at an intermediate position of the air passage, a not-shown switching valve is provided so as to occupy three positions; ON, OFF and atmosphere relief positions. Further, slide portions are provided between the pusher member 53 and the pusher plate 75 in order to allow the pneumatic actuator 43 to draw the pusher plate 75.

Since positive pressure is not introduced in the pneumatic actuator 73, tubes or pipes for introducing the pressure into the pressure chamber 51 do not swell on pressure. Therefore, it is possible to prevent the tubes or pipes from being deteriorated, thereby to improve the durability of the differential apparatus 1. Further, by making use of the negative pressure in the intake manifold of the engine, there is no need to provide an exclusive pump for driving the dog clutch 67.

At the interior of the pressure chamber 51, an annular shift spring 79 in the form of a flattened coil spring is installed for urging the clutch member 65 to the meshing side of the dog clutch 67, i.e. to the left direction in the figure. As the urging member of the invention, the shift spring 79 is disposed coaxially with the rotational axis 2 of the differential casing 3. With this arrangement, it is possible to equalize operational force required for engaging the dog clutch 67 in the circumferential direction of the differential casing 3, whereby the engagement operation at the dog clutch 67 can be carried out smoothly and responsively.

In operation, when the negative pressure is introduced into the pressure chamber 51, the diaphragm 49 simultaneously bends to the right while compressing the shift spring 79, so that the clutch member 65 is driven via. the pusher plate 75 to the right. Consequently, since the dog clutch 67 is released from its meshing condition, the outer case 5 is separated from the inner case 7.

On the contrary, when the negative pressure supply into the pressure chamber 51 is released by operating the above-mentioned switching valve, the clutch member 65 is moved to the left by the urging force of the shift spring 79, as shown in FIGS. 3 and 5. Consequently, since the dog clutch 67 is brought into its meshing condition, the outer case 5 is operatively connected with the inner case 7.

That is, at the time of switching for the four-wheel driving condition, the above-mentioned two/four wheel drive switching mechanism and the dog clutch 67 are operated so as to connect with each other. While, at the time of switching for the two-wheel driving condition, they are dissociated from each other.

In the above-mentioned way, the differential apparatus 1 of the first embodiment is constructed.

According to the embodiment, the differential apparatus 1 is constructed in a manner that the pneumatic actuator 43 serves to release the associating condition at the dog clutch 67, while the shift spring 79 serves to attain the associating condition at the dog clutch 67 when the pneumatic actuator 73 is inactivated. Therefore, even if the pneumatic actuator 43 is in a bad condition, the four wheel drive condition can be attained owing to the provision of the shift spring 79. Under such a situation, even if either one of the differential apparatus 1 or another differential apparatus on the other side races, the vehicle can be maintained so as to be capable of traveling by the other differential apparatus. Consequently, the vehicle can escape from a bad road.

Furthermore, since a connecting portion with the clutch member 65 is constituted by utilizing the conventional opening 37 for lubrication, the manufacturing cost can be reduced as much.

In addition, owing to the integration of the shift spring 79 into the pneumatic actuator 73 as one unit, the assembling, detaching and exchanging work can be facilitated thereby to reduce the operational cost remarkably.

Further, owing to an assisting effect brought by the cam 74, the engagement of the dog clutch 67 can be performed certainly, while it is possible to prevent the clutch 67 from being disengaged due to vibrations during the vehicle's traveling. Moreover, it is also possible to decrease an urging force of the urging member in proportion as the cam 74 does assist. Consequently, with the decreased force of the urging member, the actuator itself can be miniaturized to provide a compact driving source.

In the modification, the shift spring 79 may be replaced with a tensile spring arranged between the outer case 5 and the pressure plate 75. Note that, the above-mentioned structure where the cam 74 is arranged between the opening 37 and the leg portion 71 is applicable to a third embodiment of FIG. 5, which will be mentioned after describing the following second embodiment.

The second embodiment will now be described with reference to FIG. 6.

Also in this embodiment, right and left directions correspond to right and left directions shown in FIG. 4, respectively. Of course, elements with no reference numerals in the description are not shown in the figures. Further, elements similar to those in the first embodiment are indicated with the same reference numerals, respectively.

Figure 6:
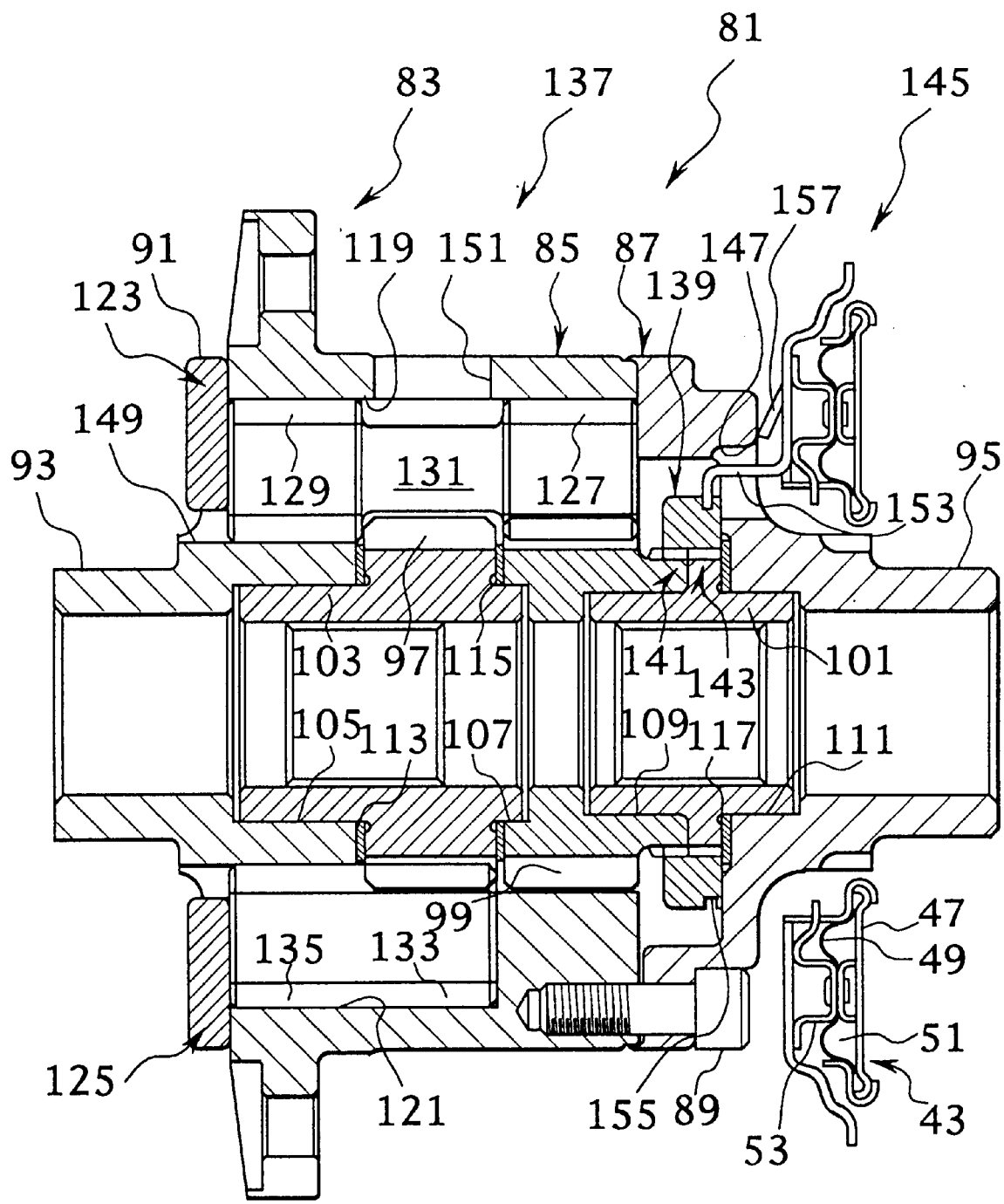
FIG. 6 is a cross sectional view of a differential apparatus in accordance with a second embodiment of the present invention.

In FIG. 6, reference numeral 81 designates a differential apparatus in accordance with the second embodiment of the invention, which is installed in a four-wheel drive vehicle and further arranged on the side of axles to which driving force of the engine is not transmitted under the vehicle's two-wheel driving condition.

A differential casing 83 of the apparatus 81 consists of a casing body 85, a cover member 87 on the right side of the casing body 85 and a ring 91 on the left side of the casing body 85. The cover member 87 is fixed on the casing body 85 through bolts 89 (only one shown), while the rings are also fixed on the casing body 85 through not-shown bolts. The differential casing 83 is arranged inside a not-shown differential carrier. A left boss portion 93 and a right boss portion 95 of the casing 83 are born by the differential carrier through the intermediary of not-shown bearings. In addition, the differential carrier is provided, at an interior thereof, with an oil reservoir which is also not shown.

The differential casing 83 includes a ring gear fixed thereto by means of bolts. The ring gear meshes with an output gear in a power transmission system. In this way, the differential casing 83 is driven on rotation by driving force of the engine. The power transmission system is provided with a two/four wheel drive switching mechanism which executes to cut off the driving force of the engine when the vehicle is in the two-wheel driving condition.

Inside the differential casing 83, left and right output side gears 97, 99 in the form of helical gears are arranged to oppose to each other. On the right side of the right output side gear 99, a sleeve 101 is arranged to operate as the output member of the present invention. A hollow boss portion 103 of the left output side gear 97 is rotatably born by a bearing portion 105 of the differential casing 83, while the right side gear 99 is rotatably supported by the left side gear 97 and the sleeve 101 through bearing portions 107, 109, respectively. Further, the sleeve 101 is rotatably born by a bearing portion 111 in the differential casing 83.

The boss portion 103 of the side gear 97 is spline-connected with an axle on the left side of the vehicle, while the sleeve 101 is spline-connected with an axle on the right side of the vehicle.

Thrust washers 113, 115, 117 are disposed between the side gear 97 and the differential casing 83, between the left side gear 97 and the right side gear 99 and between the sleeve 101 and the differential casing 83, respectively.

The differential casing 83 of the embodiment has plural pairs of long and short accommodating bores 119, 121, separated from each other at regular intervals in the circumferential direction. A long pinion gear 123 is accommodated in each of the long accommodating bores 119 so as to frictionally rotate therein, while a short pinion gear 125 is accommodated in each of the short accommodating bores 121 as to frictionally rotate therein.

Each long pinion gear 123 is composed of a first gear portion 127, a second gear portion 129 and a small diametrical axle portion 131 for connecting the first gear portion 127 with the second gear portion 129. The first gear portion 127 meshes with the right side gear 99. Similarly, each short pinion gear 125 is composed of a first gear portion 133 and a second gear portion 135 between which no axle portion is arranged. The first gear portion 133 of the short pinion gear 125 is arranged so as to mesh with the left side gear 97. On the left side of the side gears 97, 99 in the axial direction of the differential apparatus 1, the second gear portion 135 of each short pinion gear 125 meshes with the second gear portion 129 of each long pinion gear 123.

In the above-mentioned way, a differential mechanism 137 of the embodiment is constructed.

An annular clutch member 139 is arranged outside the right side gear 99 and the sleeve 101. Between the clutch member 139 and the side gear 99, a connecting part 141 is provided for movably connecting the clutch member 139 in the axial direction. A dog clutch 143 is constructed between the clutch member 139 and the sleeve 101.

When the dog clutch 143 is connected, the right side gear 99 is operatively associated with the axle of the vehicle.

Then, the driving force of the engine for rotating the differential casing 83 is transmitted from the side gear 97 to the left axle through the pinion gears 123, 125 and similarly transmitted from the side gear 99 to the right axle through the dog clutch 143 and the sleeve 101. Further, when a difference in driving resistance between the left axle and the right axle is produced by, for example, the vehicle's traveling on a bad road, the drive force of the engine is distributed into respective left and right sides of the axles by the rotation of the pinion gears 123, 125.

During transmitting the driving torque, respective tips of the pinion gears 123, 125 are urged on the walls of the accommodation bores 119, 121 by meshing reaction force of the side gears 99, 97a, thereby producing frictional resistance. Further, owing to meshing thrust force of the helical gears, frictional resistance is produced between the respective pinion gears 123, 125 and the differential casing 83 and also produced between the gears 123, 125 and the ring 91. In addition, frictional resistances are also produced between the side gear 97 and the differential casing 83 through the thrust washer 113, between the side gear 97 and the side gear 99 through the thrust washer 115, and between the sleeve 101 and the differential casing 83 through the thrust washer 117.

Owing to the above-mentioned frictional resistances, it is possible to realize differential limiting function of torque-responsive type.

When dog clutch 143 is released, elements from the sleeve 101 to the right wheel are disengaged into their free rotating conditions, while the side gear 99 is brought into its racing condition. Consequently, no driving force is transmitted to the wheel on the side of the side gear 97, too.

The pneumatic actuator 43 is arranged about the right boss portion 95 of the differential casing 83, and carried by the differential carrier through a supporting member.

The pneumatic actuator 43 is provided, on the left side of the pusher member 53, with a pressure plate 145 as an intermediate member.

The differential casing 83 is provided with three openings 147, 149, 151. Into the opening 147, a leg portion 153 of the pressure plate 145 is inserted to engage in a circumferential groove 155 of the clutch member 139.

The pressure plate 145 is provided with a spring portion 157 (as the urging member of the invention) in the form of a flexible arm. A leading end of the spring portion 157 comes into contact with the differential casing 83. With this arrangement, it is possible to directly manipulate the clutch member 139 as a fulcrum of the differential casing 3 secured in the axial direction. In addition, since the clutch member 139 is operatively associated with the differential casing 83 besides the clutch member's axial movement with respect to the differential casing 83, respective ends of the spring portion 157 and the leg portion 153 can be prevented from being worn thereby to improve the durability of the differential apparatus 81.

When positive pressure is introduced into the pressure chamber 51, the pneumatic actuator 43 causes the clutch member 130 to move to the left hand while bending the spring portion 157 of the pressure plate 145, so that the association of the dog clutch 143 is released. On the other hand, when the introduction of air into the pressure chamber 51 is stopped, the clutch member 139 returns to the right together with the pressure plate 145, whereby the dog clutch 143 is connected as shown in FIG. 6.

The above-mentioned two/four drive switching mechanism and the dog clutch 143 are manipulated for connection and also manipulated for disconnection, simultaneously.

When the two/four drive switching mechanism and the dog clutch 143 are activated for connection, the differential gear mechanism 137 distributes the driving force of the engine into the wheels thereby to bring the vehicle into its four-wheel driving condition.

On the contrary, when the connection between the two/four drive switching mechanism and the dog clutch 143 is released, the vehicle is brought into its two-wheel driving condition, while a power-transmission system from the two/four drive switching mechanism to the differential casing 83 is separated from both of the engine driving force and the rotating force of the wheels thereby to quit its rotation. Consequently, with the reduced vibrations of the vehicle, it is possible to make the vehicle ride more comfortable. In addition, frictional wear of the power transmission system can be decreased to improve the durability. Thus, it is possible to reduce a burden on the engine corresponding to the reduction in rotational resistance, whereby the vehicle can be economical on fuel.

Further, since the axles are not divided into pieces in the above-mentioned apparatus 81, there is no need to modify the conventional design of the axles.

When the differential apparatus 81 rotates, lubricating oil in the oil reservoir is introduced into the differential casing 83 via. the openings 147, 149, 151, thereby to lubricate the connecting part 141, the dog clutch 143, the accommodating bores 119, 121 and the meshing parts of gears included in the differential gear mechanism 137.

In the above way, the differential apparatus 81 is constructed.

As mentioned above, according to the embodiment, the differential apparatus 81 is constructed in a manner that the pneumatic actuator 43 serves to release the associating condition at the dog clutch 143, while the spring portion 157 serves to attain the associating condition at the dog clutch 143 when the pneumatic actuator 43 is inactivated. Therefore, even if the pneumatic actuator 43 is in a bad condition, the vehicle is capable of maintaining its four-wheel driving condition and, for example, escaping from a bad road.

Additionally, since the pressure plate 145 has the spring portion 157 formed to serve as the urging member, it is possible to decrease the number of components and miniaturize the differential apparatus 81 itself.

Note, in such an arrangement that the output member is disposed between each side gear and each wheel, the differential mechanism is not limitative to the mechanism shown in this embodiment. For example, a differential mechanism of bevel-gear type is applicable in the modification.

The third embodiment will be described with reference to FIG. 7.

Note, also in this embodiment, elements similar to those of the previous differential apparatuses 1, 81 are indicated by the same reference numerals, respectively.

Figure 7:
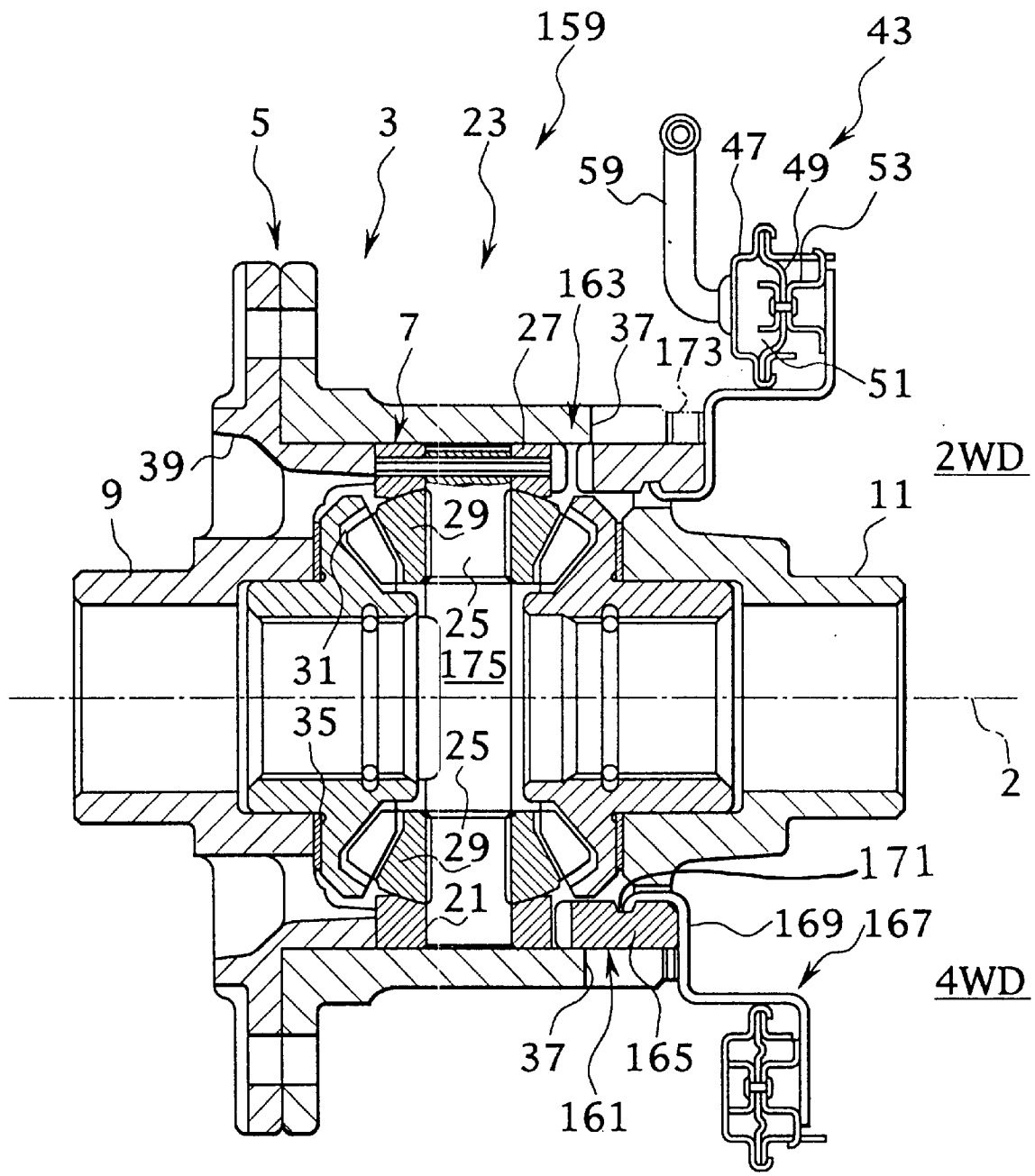
FIG. 7 is a cross sectional view of a differential apparatus in accordance with a third embodiment of the present invention.

In FIG. 7, an upper half part for the rotational axis 2 as a boundary partially shows a differential apparatus 159 under its two wheel driving, while the lower half part shows the apparatus 159 under its four wheel driving condition.

The differential apparatus 159 is provided, inside the outer case 5, with an annular clutch member 161 which is carried so as to shift in the axial direction. A dog clutch 163 is arranged between the inner case 7 and the clutch member 161. A leg portion 165 of the clutch member 161 is engaged into the opening 37 (connecting part) of the outer case 5.

Around the right boss portion 11 of the outer case 5, the pneumatic actuator 43 is arranged and carried by the differential carrier through a supporting member. The pneumatic actuator 43 of the embodiment is arranged so as to operate to the right direction.

On the right side of the pusher member 53 of the pneumatic actuator 43, a pressure plate 167 is arranged and fixed on the clutch member 161 as the intermediate member by the engagement of a leg portion 169 into a circumferential groove 171. Therefore, the pressure plate 167 does not rotate relatively to the outer case 5.

Interposed between the pressure plate 167 and the outer case 5 is a tensile shift spring 173 as the urging member, of which both axial ends are fixed to the outer case 5 and the pressure plate 167 and which urges the clutch member 161 thereby to mesh the dog clutch 163 (to the left direction).

When the positive pressure is introduced into the pressure chamber 51, the pneumatic actuator 43 causes the clutch member 161 to move to the right hand while expanding the shift spring 173, so that the association of the dog clutch 163 is released, as shown in the upper part of FIG. 7. On the other hand, when the introduction of air into the pressure chamber 51 is stopped, the clutch member 161 is returned to the right by tensile action of the shift spring 173, so that the dog clutch 163 is activated to connect the outer case 5 with the inner case 7.

The two/four drive switching mechanism and the dog clutch 163 are manipulated for connection at the time of switching for four-wheel driving condition, while they are manipulated for disconnection at the time of switching for two-wheel driving condition.

Note, the pinion shaft 25 of the differential gear mechanism 23 is arranged radially about a boss member 175 as a center.

In this way, the differential apparatus 159 of the embodiment is constructed.

As mentioned above, according to the embodiment, the differential apparatus 159 is constructed in a manner that the pneumatic actuator 43 serves to release the associating condition at the dog clutch 163, while the shift spring 173 serves to attain the associating condition at the dog clutch 173 when the pneumatic actuator 43 is inactivated. Therefore, even if the pneumatic actuator 43 is in a bad condition, the four wheel drive condition can be attained, whereby the vehicle can be escaped from a bad road.

Furthermore, since a connecting portion with the clutch member 161 is constituted by utilizing the opening 37 of the outer case 5, the manufacturing cost can be reduced as much.

In addition, since the shift spring 173 is arranged outside the differential casing 3, the interior structure of the casing 3 can be simplified as much thereby to miniaturize it and facilitate the exchanging operation of the shift spring 173.

Further, since the pressure plate 167 and the outer case 5 rotate in one body, the shift spring 173 disposed therebetween can be prevented from being worn, so that the durability of the differential apparatus 159 can be improved.

Finally, it is to be understood that the preferred embodiments disclosed herein are by way of example only and are not intended to impose limitations on the present invention, reference being had for this purpose to the claims which follow.

What is claimed is:

1. A differential apparatus in combination with a partial four-wheel drive vehicle having an engine and a two-wheel/four-wheel driving switching mechanism arranged on the side of the two axles to which engine driving force is not transmitted under the vehicle's two-wheel driving condition, said differential apparatus comprising:

a differential casing having an input gear fixed thereto, said differential casing being rotated by the engine through the intermediary of said input gear;

a pair of output side gears disposed in said differential casing, opposing each other and rotating coaxially with an axis of said differential casing;

a differential mechanism distributing driving force of said engine, which has been inputted from said differential casing, into both of said axles of said vehicle through said output side gears;

a clutch for operatively connecting said differential casing with said axles of said vehicle so that driving torque applied on said differential casing is transmitted to said axles;

an actuator for releasing said clutch from connecting operation thereof in a manner that the driving torque applied on said differential casing is not transmitted to said axles;

an urging member for causing said clutch to connect said differential casing with said axles on condition that said actuator is inactivated, whereby said driving torque applied on said differential casing can be transmitted to said axles;

wherein said clutch, actuator and urging member constitutes said two-wheel/four-wheel drive switching mechanism, said two-wheel/four-wheel drive switching mechanism arranged nearby the differential casing; and said urging member comprises an annular urging member disposed coaxially with the rotational axis of said differential casing, said actuator comprising an annular actuator disposed coaxially with the rotational axis of said differential casing, said actuator comprising and fluid pressure actuator disposed between a side wall of said differential casing and a bearing for carrying said differential casings, said fluid pressure actuator having an operating chamber filled with fluid, whereby the associated operation of said clutch can be released since said clutch is shifted in a direction of the rotational axis of said differential casing by changing a volume of said fluid accommodated in said operating chamber.

2. A differential apparatus as claimed in claim 1, wherein said urging member is disposed in said fluid pressure actuator.

3. A differential apparatus as claimed in claim 2, wherein said differential casing comprises an outer case which rotates by the driving force of said engine, an inner case which is arranged in said outer case so as to rotate relative to said outer case, and a clutch member movably connected to either one of said outer case and said inner case through a connecting part of said clutch member and wherein said clutch is interposed between said clutch member and the other one of said outer case and said inner case, whereby said actuator is capable of moving said clutch member in a direction where the association of said differential casing with said axles of said vehicle due to said clutch will be released.

4. A differential apparatus as claimed in claim 3, wherein said actuator is arranged outside said outer case and adapted so as to operatively move said clutch member which is inserted into said outer case through an opening formed in said outer case and which is connected to said actuator.

5. A differential apparatus as claimed in claim 4, wherein said outer case and said clutch member are provided, at both connecting parts thereof, with cams which are subjected to the driving torque transmitted thereby to exert a thrust force on said clutch, whereby said differential casing can be associated with said axles of said vehicle.

6. A differential apparatus as claimed in claim 1, wherein said urging member is arranged so that one end thereof comes into contact with said differential casing while another end of said urging member comes into contact with said clutch.

7. A differential apparatus as claimed in claim 1, wherein said fluid pressure actuator is a negative pressure actuator.

8. A differential apparatus as claimed in claim 1, further comprising output members each of which is disposed between each of said output side gears and each of said axles and a clutch member movably connected to either one of said output members and either one of said side gears through a connecting part of said clutch member, wherein said clutch is interposed between said either one of said output members and said either one of said side gears, whereby said actuator is capable of moving said clutch member in a direction where the association of said differential casing with said axles of said vehicle due to said clutch will be released.

* * * * *